United States Patent [19]

Dix

[11] 4,303,350
[45] Dec. 1, 1981

[54] SEPTIC LEACHING SYSTEM

[76] Inventor: Stephen P. Dix, 117 E. Stuart, Ft. Collins, Colo. 80525

[21] Appl. No.: 132,253

[22] Filed: Mar. 20, 1980

[51] Int. Cl.³ .................... E02B 11/00; E02B 13/00; B01D 23/16; F17D 1/08
[52] U.S. Cl. .................................... 405/36; 210/170; 210/263; 210/288; 137/236 R; 405/41
[58] Field of Search ..................... 405/36, 37, 39–43, 405/45, 50, 51; 210/153, 170, 263, 265, 284, 286, 288, 291, 293, 532.2, 607, 617; 137/236 R, 571, 575, 577, 592, 593

[56] References Cited

U.S. PATENT DOCUMENTS

| | | | |
|---|---|---|---|
| 778,323 | 12/1904 | Martin | 405/41 |
| 2,760,643 | 8/1956 | Schaaf | 210/288 |
| 3,559,408 | 2/1971 | Earnhart | 405/36 |
| 3,698,194 | 10/1972 | Flynn | 405/36 |
| 3,874,596 | 4/1975 | Baxter | 239/542 |
| 4,251,359 | 2/1981 | Colwell et al. | 210/617 |

Primary Examiner—Price C. Faw, Jr.
Assistant Examiner—Nancy J. Pistel
Attorney, Agent, or Firm—Hugh H. Drake

[57] ABSTRACT

In a system for leaching septic effluent from a source thereof, a first leach field has an input, a porous bed and means for distributing effluent from the input throughout the bed. A second leach field similarly has an inlet, a pervious bed and means for distributing effluent from that inlet throughout the pervious bed. Distribution means, having an intake coupled to the source, selectively feeds the effluent only to the input until the effluent level in the first field reaches a predetermined depth. Thereafter, the effluent is automatically fed to the inlet of the second leach field. The principle of operation is extended to the use of a third or more leach fields, the distribution means selectively feeding the effluent to the entrance to the third field only after the effluent in the second field reaches a preselected depth and so on.

14 Claims, 6 Drawing Figures

SEPTIC LEACHING SYSTEM

The invention pertains to a septic leaching system. More particularly, it relates to a system for selectively controlling the feeding of effluent as among a plurality of different leach fields.

In the matter of the treatment of sewage and other waste water, intensive development effort has been directed to the improvement of systems for handling the sewage produced, in a common mix, from urban areas. A typical municipal plant may involve the use of huge digesters, aeration units, settling lagoons and other facilities. In more rural areas, however, reliance still must often be had upon individual on-site septic systems.

In some cases, the individual rural residential user may have little problem in connection with the installation and operation of a septic system satisfactory for his requirements. However, problems often arise. It has been estimated that only about thirty percent of the land area in the United States has soil which is suitable for on-site waste water systems. Increasing development of marginal land has enhanced the problem. As a result, substantial effort has occurred for the purpose of improving performance of systems for leaching effluent.

In a fundamental kind of septic system, the sewage is fed into a tank wherein anaerobic biological action is relied upon to decompose the raw sewage into more basic elemental chemical components. Solid constituents tend to settle to the bottom of the tank and out of a body of liquid within the tank called the effluent. In general, the central portion of the effluent becomes the most pure and, in response to additional input, is allowed to overflow outwardly from that central portion. The outletted fluid is then fed into what is known as a leach field.

A typical leach field includes a bed of course gravel, from one to several feet in depth, disposed beneath an overlying layer of soil. Distributed throughout the gravel bed is an array of apertured piping. The effluent from the septic tank is fed into that array and emerges from the pipes in a manner so as to be spread throughout the bed. In one mode of operation, the leached effluent soaks downwardly on into the ground below and/or outwardly into the ground away from the field. In many cases, however, at least a portion of the effluent is wicked upwardly through the soil and ultimately is evaporated and transpired through plants into the atmosphere. This latter process is referred to as evapo-transpiration.

In many cases, the underlying and surrounding ground is sufficiently impervious to the effluent that the effect of evapo-transpiration must be relied upon, at least almost entirely, for ultimate disposal of the effluent. In other cases, the gravel or equivalent distribution bed is purposely placed upon and within an impervious material, so that evapo-transpiration is relied upon entirely for ultimate dispensation of the effluent from the field. This latter approach is most suitable when there is concern with the possibility of the pollution of underground water supplies by the effluent.

In the operation of systems that rely upon evapo-transpiration, maximum efficiency is attained when the bed within the leach field is filled to capacity so that the upper level of the effluent is in direct contact with the overlying wicking material such as soil. On the other hand, a finite depth of the wicking material is necessary in order to avoid direct exposure to the atmosphere of the body of contained effluent, an event which would expose the effluent to the capability of being able to emit odors and contaminants into the atmosphere or permit freezing of the effluent. By interposing the evapo-transpiration process, it is only the equivalent of a distilled vapor that is released into the atmosphere.

Of course, a leaching system cannot continue to operate if filled to maximum capacity. It could not then accept additional waste water. Thus, there is an inherent conflict in sizing a leaching system to offer sufficient storage capacity to handle peak loads and/or times of lower evapo-transpiration (as occurs in cold weather) and yet maximize the rate of evapo-transpiration so as to reduce the total overall size (and cost) of the system.

To operate a given leach field at maximum capacity, it previously has been known to couple a first leach trench to a second leach trench spaced beyond the first and located at a lower elevation. The first trench is coupled to the second in a manner such that, when the first is filled to the elevation of the invert leading to the next bed, further effluent inletted thereinto flow on into the second and lower leach field. This serial distribution requires that the overall terrain be terraced or otherwise contoured so that the two different leach fields occupy different elevations. It also means that one particular bed always must be used first and can never be rested.

It also is known in the prior art to supply effluent from a common septic tank to any one or more of a plurality of leach fields. In U.S. Pat. No. 3,698,194— Flynn, a conduit leading from a septic tank to any one leach field includes a valving arrangement operable to cut off the flow to that leach field in order to let it dry, preferably along with the forced feeding of circulating air thereto for that purpose. This approach does not accommodate evapo-transpiration; it relies on soaking of surrounding soil and evaporation from a less-than-full leach field. In irrigation systems, various multiple flow path arrangements are known. A particular example of that is U.S. Pat. No. 3,559,408—Earnhart, wherein there is an intermediate sump in which vertically spaced outlet openings are provided. A lower outlet opening leads to a holding tank, and an upper outlet serves as an overflow. In U.S. Pat. No. 778,323—Martin, an irrigation system is disclosed that employs vertically-adjustable standpipes so as to obtain equal flow at different portions of sloping or otherwise irregular terrain. In the further irrigation system of U.S. Pat. No. 3,874,596—Baxter, there is an adjustable interior standpipe within an upright column, with each of a plurality of such standpipes being spaced along an irrigation line. Adjustment of the heights of the standpipes as between the different uprights permits the proportioning of the flow as desired at the different locations.

It is a general object of the present invention to provide a new and improved leach system as compared with leach systems of the kinds described above.

Another object of the present invention is to provide a new and improved leach system that affords an increased facility of control and operation.

A further object of the present invention is to provide a system that employs a plurality of leach fields, while affording the capability of selecting sequential usage thereof.

A specific object of the present invention is to provide a new and improved plural leach field system in which the respective different leach fields may be located at a common elevation and in which the number of leach fields used automatically is selected to obtain increased efficiency of evapo-transpiration.

In accordance with the present invention, a system for leaching septic effluent includes a source of that effluent. A first leach field has an input, a porous bed, means for distributing effluent from that input throughout the bed and a layer of wicking material convering the bed. A second leach field, which may be at the same elevation as the first, similarly has an inlet, a pervious bed, means for distributing effluent from that inlet throughout the pervious bed and a layer of wicking material covering the bed. Distribution means has an intake coupled to the source and serves to selectively feed the effluent only to the input until the effluent level in the first field reaches a predetermined depth. It then responsively and automatically feeds the effluent to the inlet of the second leach field. Desirably, the effluent continues to be available to the input as it is fed to the inlet.

The features of the present invention which are believed to be patentable are set forth with particularity in the appended claims. The organization and manner of operation of the invention, together with further objects and advantages thereof, may best be understood by reference to the following description taken in connection with the accompanying drawings, in the several figures of which like reference numerals identify like elements, and in which:

Figure 1:
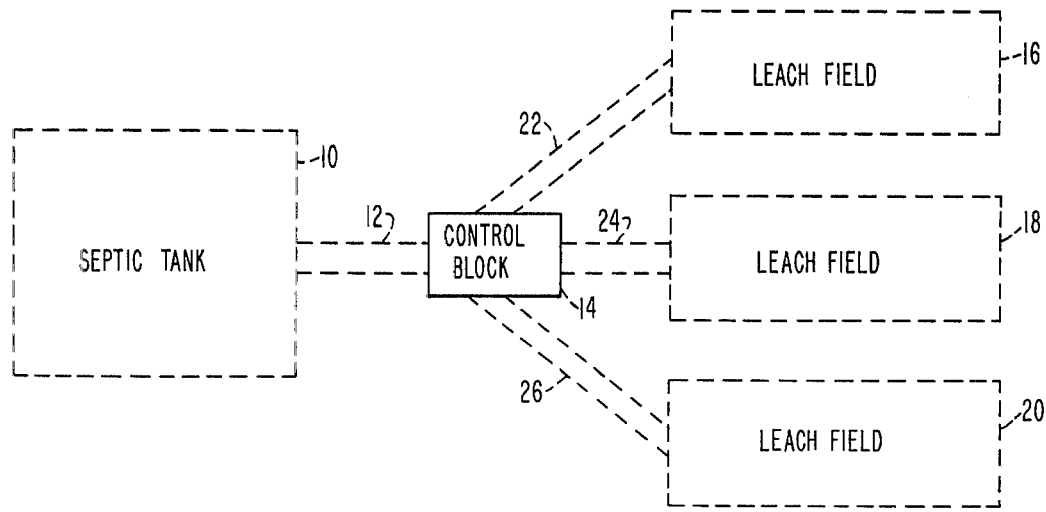
FIG. 1 is a diagrammatic representation of a system for leaching septic effluent.

As shown in FIG. 1, a septic tank 10 is located and connected to receive raw sewage. Within tank 10, in the normal manner, that raw sewage is settled and is subjected to anaerobic reduction with the concomitant delivery by overlow of a liquid effluent. That effluent is fed through a conduit 12 to a control block 14. As part of the overall septic system, there are in this case three separate leach fields 16, 18 and 20. Those fields individually are fed with effluent from control block 14 selectively by respective different conduits 22, 24 and 26.

Figure 2:
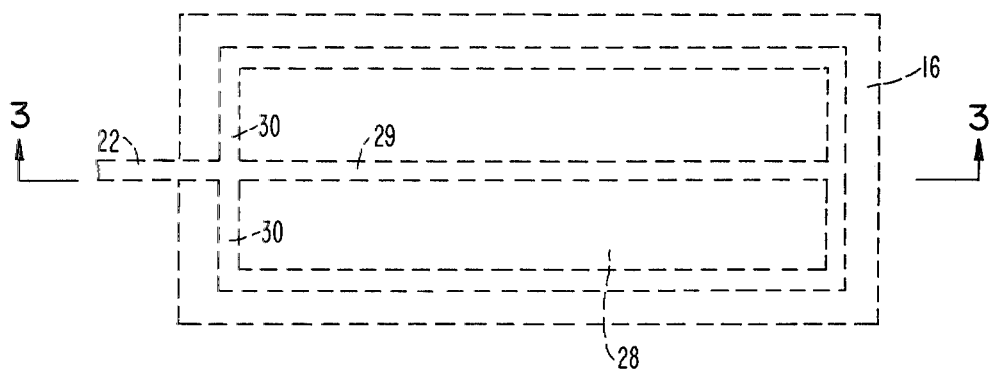
FIG. 2 is a diagrammatic representation of a leach field included within the system of FIG. 1.
Figure 3:
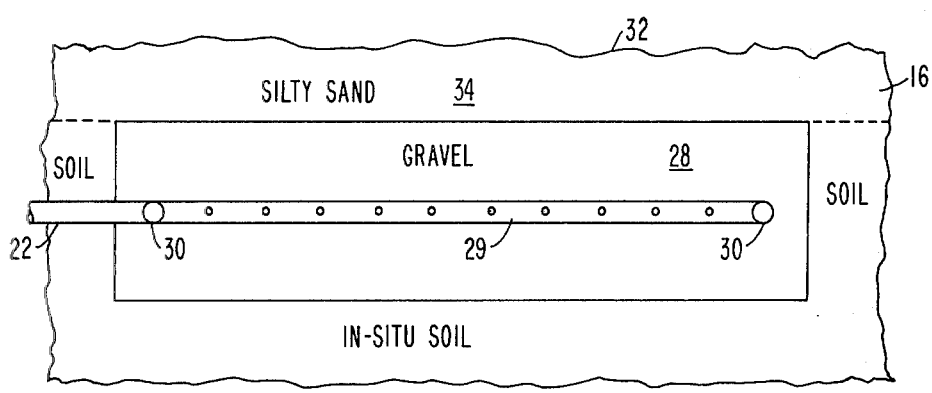
FIG. 3 is a cross-sectional view taken along the line 3—3 in FIG. 2.

As herein embodied, leach fields 16, 18 and 20 are constructed in the same manner, so that the illustrations in FIGS. 2 and 3 with respect to leach field 16 are sufficient for an understanding of all of the leach fields. Thus, conduit 22 is coupled into the input, inlet or entrance of an array of piping that serves to distribute the effluent throughout a bed 28 of coarse stone, gravel or equivalent material that is sufficiently porous and pervious as to be readily permeable to the effluent being distributed throughout the bed. In the particular arrangement shown, conduit 22 continues from the input side of bed 28 centrally thereof as a perforated manifold 29 and is coupled to laterally displaced perforated-pipe loops 30.

Bed 28 is typically between one and several feet deep and is disposed beneath the surface 32 of the surrounding ground. Of course, the area of the bed will depend upon the use to be served, but an example would be a bed that occupied about five-hundred square feet in horizontal area and was located up to twenty feet from the septic tank. For the purpose of achieving evapo-transpiration from effluent within bed 28 to the atmosphere above, bed 28 is covered by a layer 34 of a wicking material such as a silty sand. The wicking material covers the bed and separates it from the atmosphere above. Bed 28 is surrounded by and overlies the native soil in which the leach field is located. Layer 34 may be from about twelve to eighteen inches in depth for the typical installation. However, that depth will vary in accordance with climate and the materials used for layer 34. Although the effluent normally is well above freezing temperatures, care must be exercised in accordance with conventional practice for a particular region. Also, the capacity of the material of layer 34, to pull water upwardly, is to be accommodated.

Control block 14 serves as a distribution means for effluent received at its intake from conduit 12. In the first specific embodiment of FIG. 4, conduit 12 leads into a sump 40 formed of poured concrete or molded from a durable plastic, fiberglass or other material that is non-corrosive in the presence of the effluent. Sump 40 is closed across its otherwise open top by a removable and usually insulated cover 42. Depending downwardly from the bottom of sump 40 are three separate couplings 44, 46 and 48. Individually joined respectively to those couplings are one end of each of conduits 22, 24 and 26. Correspondingly projecting upwardly from each of the couplings, and within the interior of sump 40, are respective standpipes 50, 52 and 54. Each of standpipes 50–54 is adjustably movable in a vertical direction.

As specifically shown herein for purposes of illustration, standpipes 50–54 are each frictionally seated within a downwardly-projecting sleeve which forms the corresponding one of couplings 44–48. Thus, the height of each of standpipes 50–54 is adjustable, upon removal of cover 42, simply by manually pulling the standpipe up or pushing it down within its coupling. In the alternative, the standpipes may be threaded into the couplings to permit the vertical height adjustment, or an appropriate clamp may be employed. Each standpipe is adjustable to a height relative to the elevation of the invert 12 leading from the septic tank.

During installation, beds 28 of all of leach fields 16, 18 and 20 as illustrated are located so at least their upper surfaces are at essentially the same elevation. At the same time, sump 40 is so located that its bottom is below that elevation, while its depth is sufficient to permit effluent to rise therein above that elevation.

Figure 4:
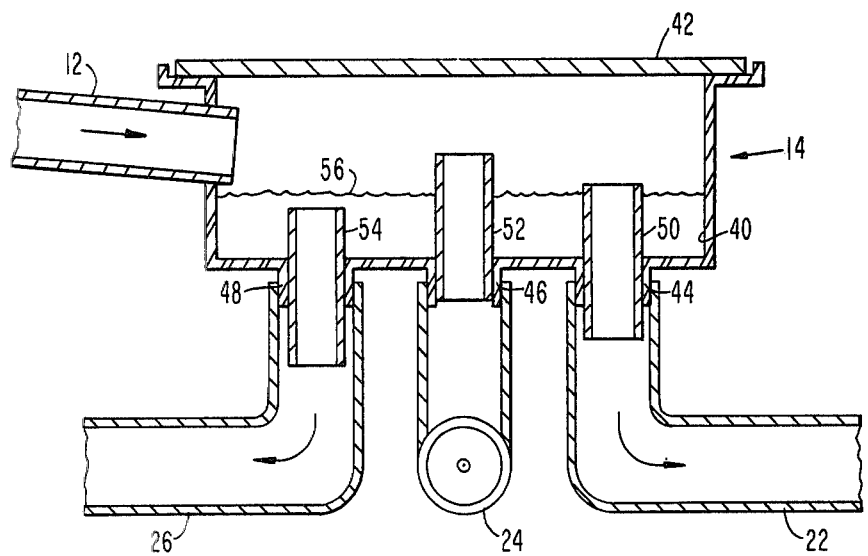
FIG. 4 is an enlarged cross-sectional view of a component included in the system of FIG. 1.

In the arrangement specifically shown in FIG. 4, standpipe 54 had been adjusted vertically so that its top is at a lowermost level as compared with the others. Standpipe 50 has been vertically adjusted so that its top is a little higher, and standpipe 52 has its top positioned at a still greater level. When effluent initially is inletted into sump 40, its level 56 begins to rise until the top of standpipe 54 is reached. At that point, the effluent begins spilling into standpipe 54 and continues through coupling 48 and conduit 26 into leach field 20. As the effluent within leach field 20 thereafter rises in level within its bed 28, effluent will continue to flow into that leach field through conduit 26 until the level therein corresponds in elevation to the level of the top of conduit 54. Thereupon, level 56 of the effluent within sump 40 will begin to rise above the top of standpipe 54 until it reaches the level of the top of conduit 50.

So long as leach field 20 remains at its thus filled capacity, the continued intake of effluent into sump 40 then results in a spilling of the effluent into standpipe 50, through coupling 44 and conduit 22 into leach field 16. Leach field 16 then continues to be filled in a like manner until the level of effluent therein reaches the level of the top of standpipe 50. Thereafter, as leach field 16 continues to be filled to a still greater level, level 56 of the effluent within sump 40 again begins to rise until it reaches the level of the top of standpipe 52.

It will be observed that, while leach field 16 is being filled through standpipe 50, the level in leach field 20 continues to rise a corresponding amount by reason of the communication that continues to be available through standpipe 54 to that leach field. With the beginning of the spillage of effluent into standpipe 52 and through coupling 46 and conduit 24 to leach field 18, the effluent level within all three leach fields thereafter rises. The overall system continues to be operative until a point might be reached at which all three leach fields are at capacity and/or the effluent begins to spill from beneath cover 42 and out of the top of sump 40.

As a matter of economics and other practical considerations, the total leach field area is designed to be sufficient to accommodate the maximum amount of effluent which must be dissipated in view of seasonal changes to be expected in the rate of evaporation achieved by evapo-transpiration through layer 34. That is, evaporation will be at a lower rate during cold-weather months. That variation is collated with possible seasonal or other variations in the quantity of effluent received for a given operation served.

With the maximum leach field area having been chosen in accordance with expected usage, most efficient operation of the system over the long term is achieved with the present system by time using no greater a number of leach fields 16, 18 and 20 than necessary. Any one of the leach fields operates most efficiently when the level of effluent therein is maintained at a maximum elevation. That is, the greatest rate of evapo-transpiration is obtained when the effluent entirely fills bed 28 and its upper surface is in contact with and even penetrates into the bottom portion of layer 34. Consequently, lowermost standpipe 54, in the arrangement specifically shown in FIG. 4, is adjusted in height so that only leach field 20 is employed operatively in the system until that leach field is entirely filled. Standpipe 50 correspondingly is adjusted so that, as long as leach field 20 remains filled, only leach field 22 is additionally employed until such time as it also is completely filled. Thus, the last standpipe 52 is adjusted so that the third leach field 18 is employed only at a time when both of the other two leach fields are full.

It is to be observed that sump 40 does not need to be any larger than necessary to accommodate connection to the different conduits. Moreover, its depth may be quite small if desired. That is, the difference in height as between the different ones of standpipes 50, 52 and 54 can be very small, such as an inch or less, while yet obtaining complete control over the filling of leach fields which, for example, may each be several feet in depth of bed.

As the different standpipes are arranged in the specific depiction of FIG. 4, a given order of priority of use of the plurality of leach fields is established. One important benefit of the illustrated arrangement in the ease of changing that priority from time to time. This permits different ones of the leach fields to be rested at respective different times of lower than full-capacity operation. Such resting of the leach fields is advantageous because, during continued operation of any given leach field, its hydraulic conductivity begins to decrease and there is a falloff in performance. On the other hand, its performance tends to be restored when it is allowed a period for drying out. Accordingly, at different periods during long-term operation, standpipe 50 will be adjusted so as to be the lowest and yet at other times it will be standpipe 52 which is adjusted to be the lowest.

Figure 5:
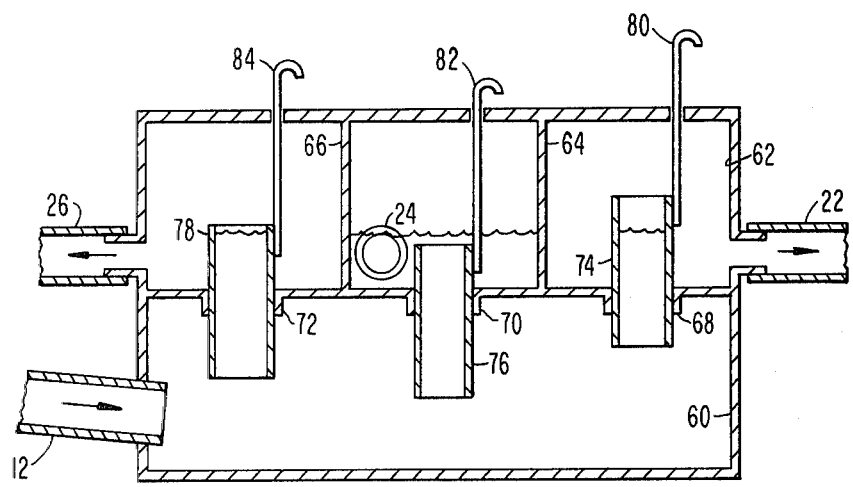
FIG. 5 is a similar cross-sectional view of an alternative form of that component.

By way of further exemplification, FIG. 5 depicts an alternative form of control block 14a. In this embodiment, effluent is supplied at its intake from conduit 12 and is collected beneath a plurality of respective compartments 62, 64 and 66. Conduits 22, 24 and 26 are coupled respectively into the lower portions of each of compartments 62, 64 and 66. Projecting downwardly from each of those compartments are respective sleeves 68, 70 and 72 within which and frictionally seated therein are corresponding standpipes 74, 76 and 78. Each of those standpipes is manually adjustable as to height by manipulation of a respective one of handles 80, 82 and 84 that extend through and have an outer end which projects above the associated one of the compartments.

The principle of operation of control block 14a is the same as before. In this case, however, the effluent first fills sump 60 and then continues to rise on upwardly within the standpipes until, as specifically shown, it begins to spill out of the lowermost standpipe 76. That enables effluent to begin flowing into conduit 24 to leach field 18. When the latter has been filled to capacity, effluent level in the next higher standpipe 78 rises to a level sufficient to spill out of that standpipe and soon begins to flow outwardly through conduit 26 to the now second leach field 20. The same filling process continues until the highest standpipe 74 begins to overflow as a result of which the third leach field 16 then begins to fill by way of effluent fed through conduit 22. All of the various different modes of selectivity and ordering of priority are available as before.

The arrangements of either FIGS. 4 and 5 are advantageous in that all control adjustment may be made at the common location of control blocks 14 or 14a. Nevertheless, the same principle of operation is attained with the arrangement of FIG. 6 wherein the control block is illustrated as being physically separated into different portions. In this case, the effluent from septic tank 10 is fed through conduit 12 into a first sump 90. The effluent rises in sump 90 until it reaches the level of conduit 22 that leads to leach field 16. Situated within and vertically adjustable in position is a cup 92 in the wall of which is an aperture 94. In this version, conduit 22 has its input to leach field 16 located at approximately the top of the bed 28 in that leach field. Thus, the level of effluent within its bed 28 will rise until conduit 22 remains filled. At that point, the level of effluent within sump 20 rises to an elevation sufficient to allow the effluent to spill into cup 92. It will thus be seen that cup 92 serves as a standpipe into which the effluent is permitted to flow only after leach field 16 has been filled. An additional conduit 96 is coupled into the bottom of cup 92 and leads to another sump 98. Sump 98 similarly includes an internal and vertically adjustable cup 100 also provided in its side wall with an aperture 102. Conduit 24, that feeds leach field 18, is coupled at one end through the side wall of sump 98 and at its other end serves as the inlet to leach field 18. Coupled into the bottom of cup 100 is what amounts to one end of conduit 26 that feeds the third leach field 20.

It now will be observed that the basic mode of operation is the same as before, so far as the leach fields are concerned. After leach field 16 has been filled and the effluent begins to spill into aperture 94 of cup 92, effluent then is conducted through conduit 96 into cup 98. As the effluent rises in the latter, it first enters conduit 94 and flow therein continues until leach field 18 is filled. When the consequent backup in conduit 24 allows the level of effluent within sump 98 to rise a slight bit more, the effluent then begins to flow into aperture 102 so as to begin to fill cup 100. Shortly thereafter, effluent now is fed through conduit 26 into leach field 20 and the process of filling of the latter is begun.

Figure 6:
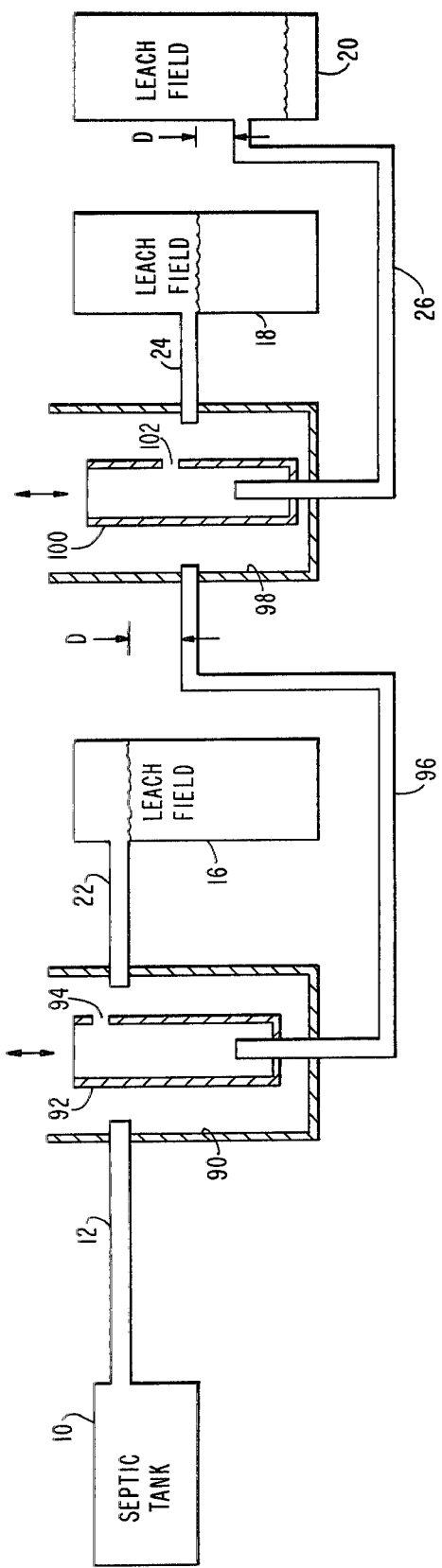
FIG. 6 is a diagrammatic view of an alternative form of the system of FIG. 1.

In FIG. 6, the relative differences in levels of the various conduits and apertures is exaggerated for the purpose of presentation. As in the case of the preceding embodiments, the difference in control levels may be as little as one inch or less. That is, the different distances D illustrated in FIG. 6 may be very small, so that ultimately all three of the leach fields may be filled to essentially the same level. Moreover, it is to be noted that the order of filling of the different leach fields may be changed as desired. For example, cup 92 may be lowered to rest leach field 16, assigning priority to either one of the other leach fields. In that case, however, cup 92 must be raised before field 16 again can receive effluent.

From another viewpoint, the described distribution system, in itself, also is applicable to the feeding of effluent to beds at respective different elevations. To accommodate beds at different elevations and still obtain the pertinent advantage of automatic operation, however, there must be some sort of signal fed back which represents filling of a first bed and enables feed of effluent to a second bed. In the illustrated systems, that "signal" is produced automatically as a result of the effluent level in a first bed rising to a selected height. With different bed elevations, however, such a signal may be generated by a distinct level sensor that causes operation of corresponding flow controls. In any case, and for the reasons presented, the supply of fluid to a bed first filled should be continued as a subsequently-used bed is being employed unless that bed first filled is to be rested.

To summarize some of the advantages and benefits of the described embodiments, it will be observed that the described approaches allow for a variable sequential loading of a plurality of different leach fields all preferably located at least approximately at the same elevation so as to be suitable for installation on level ground. During off-peak periods of usage of the overall system, one or even two of the beds may be rested. The final bed held in the rest condition is the last to fill. On the one hand, the total area of leach fields available may be used when required. On the other hand, there is maximized use of individual leach field capacity when less than all of the leach fields are needed.

There also tends to be a maximum utilization of storage beyond what is present in the bed of the leach field. That is, the leach field first filled affords some additional storage in the soil or other wicking material above its bed, and this is employed as others of the leach fields subsequently are brought into use.

The illustrated systems serve to improve performance by increasing the hydraulic conductivity of the soil. This is a result of an increased pressure which results as the depth of water in each bed is increased.

Increased elevation of the water improves both infiltration and evaporation. In a non-uniform media, a greater quantity of water may be pulled toward the upper surface and lost to the atmosphere when the distance, from the top of the water in the bed to the upper surface, is reduced. Thus, there is a related increase in evapo-transpiration by tending to force a maximum amount of the retained effluent closer to the transpiration layer. Increased depth of the water in any given bed also tends to provide an increased surface area for absorption through the additional side wall area which is contacted by the effluent.

The employment of variable sequential loading thus allows both water-depth control in each bed and control of priority of the filling of the beds. As each bed successively fills, the performance of all beds in use improves. More specifically, the evapo-transpiration rate increases by reason of decreased distance between the overlying ground surface and the surface of the effluent within the bed. Hydraulic conductivity increases, as indicated, by virtue of the increased depth of the water in the bed. Generally, flow in a porous media, an essential parameter for infiltration, is equal to the product of the hydraulic conductivity, the area and the pressure gradient. It will thus be observed that operation of the system in the manner described tends at all times to maximize that rate of flow in whichever beds are being used.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of that which is patentable.

I claim:

1. A system for leaching septic effluent comprising:
   a source of septic effluent;
   a first leach field having an input, a porous bed, means for distributing effluent from said input throughout said bed and a layer of wicking material covering the bed and separating the same from the atmosphere;
   a second leach field at substantially the same elevation as said first field and having an inlet, a pervious bed, means for distributing effluent from said inlet throughout said pervious bed and a layer of wicking material covering the bed and separating the same from the atmosphere;
   and distribution means, having an intake coupled to said source, for selectively feeding said effluent only to said input until the effluent level in said first field reaches a predetermined depth and then responsively and automatically feeding said effluent to said inlet.

2. A system as defined in claim 1 wherein said distribution means continues the availability of said effluent to said input while feeding said effluent to said inlet.

3. A system for leaching septic effluent comprising:
   a source of septic effluent;
   a first leach field having an input, a porous bed, means for distributing effluent from said input throughout said bed and a layer of wicking material covering the bed and separating the same from the atmosphere;

a second leach field having an inlet, a pervious bed, means for distributing effluent from said inlet throughout said pervious bed and a layer of wicking material covering the bed and separating the same from the atmosphere;

and distribution means, having an intake coupled to said source, for feeding said effluent selectively only to either one of said input and inlet until the effluent level in the field supplied by said one reaches a predetermined depth and then responsively and automatically feeding said effluent to the other of said input and inlet.

4. A system as defined in claim 3 wherein said distribution means continues the availability of said effluent to said one as while feeding said effluent to said other.

5. A system as defined in claim 1 or 3 which further includes a third leach field having an entrance, a permeable bed, means for distributing effluent from said entrance throughout said permeable bed and a layer of wicking material covering the bed and separating the same from the atmosphere, and in which said distribution means selectively feeds said effluent to said entrance only after the effluent in the field second to be fed reaches a preselected depth.

6. A system as defined in claim 1 or 3 in which said predetermined depth corresponds substantially to a complete filling of said porous bed with said effluent.

7. A system as defined in claim 1 or 3 in which said distribution means includes:
a sump coupled to receive effluent from said intake;
a first coupling for delivering effluent from said sump to said input;
a second coupling for delivering effluent from said sump to said inlet;
and means responsive to the level of effluent in the first of said fields to be fed for enabling the flow of effluent from said sump through the coupling to the other of said fields.

8. A system as defined in claim 7 in which said responsive means includes respective standpipes disposed to govern flow of effluent from said sump to the corresponding ones of said couplings.

9. A system as defined in claim 8 in which said standpipes are relatively adjustable in mutually comparative height.

10. A system as defined in claim 8 in which the bottom of said sump is located above said standpipes.

11. A system as defined in claim 8 in which the bottom of said sump is located below said standpipes.

12. A system as defined in claim 8 in which the top of the one of said standpipes governing flow of effluent to the coupling of the first of said fields to be fed is at an elevation the same as the effluent level in said first fed field at said predetermined depth.

13. A system as defined in claim 1 or 3 in which said distribution means includes:
a first sump coupled to receive effluent from said intake;
a first coupling for delivering effluent from said first sump to a first one of said fields through the corresponding one of said input and inlet;
a standpipe disposed within said first sump for diverting effluent from said sump when said effluent in the first of said fields to be fed reaches said predetermined depth;
and a second coupling for delivering to the order of said fields, through the other of said input and inlet, effluent diverted from said first sump by said standpipe.

14. A system as defined in claim 13 in which the effective height of said standpipe is adjustable.

* * * * *